United States Patent
Kunieda et al.

(10) Patent No.: US 8,357,333 B2
(45) Date of Patent: Jan. 22, 2013

(54) HONEYCOMB STRUCTURAL BODY AND EXHAUST GAS CONVERTING APPARATUS

(75) Inventors: Masafumi Kunieda, Ibi-Gun (JP); Yuki Fujita, Ibi-Gun (JP); Hiroki Sato, Ibi-Gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 305 days.

(21) Appl. No.: 12/910,874

(22) Filed: Oct. 25, 2010

(65) Prior Publication Data

US 2011/0116988 A1    May 19, 2011

(30) Foreign Application Priority Data

Nov. 19, 2009    (WO) .................. PCT/JP2009/069655

(51) Int. Cl.
*B01D 50/00*   (2006.01)
(52) U.S. Cl. ........................ 422/180; 422/177
(58) Field of Classification Search ............ 422/177, 422/180; 55/523; 428/116; 60/297
See application file for complete search history.

(56) References Cited

U.S. PATENT DOCUMENTS

| | | | |
|---|---|---|---|
| 5,019,263 A | 5/1991 | Haag et al. | |
| 5,492,883 A | 2/1996 | Wu | |
| 5,589,147 A | 12/1996 | Farnos et al. | |
| 6,171,557 B1 * | 1/2001 | Takahashi et al. | 422/177 |
| 2004/0166035 A1 | 8/2004 | Noda et al. | |
| 2007/0259770 A1 | 11/2007 | Hofmann et al. | |
| 2009/0214397 A1 * | 8/2009 | Shirono et al. | 422/177 |

FOREIGN PATENT DOCUMENTS

| | | |
|---|---|---|
| JP | 4-227826 | 8/1992 |
| JP | 2003-33664 | 2/2003 |
| JP | 2004-202426 | 7/2004 |
| JP | 2007-7534 | 1/2007 |
| JP | 2007-296521 | 11/2007 |
| JP | 2008-169104 | 7/2008 |
| WO | WO 2006/137149 | 12/2006 |
| WO | WO 2010/135625 | 11/2010 |

OTHER PUBLICATIONS

Extended European Search Report for corresponding EP Application No. 10175405.9-2104, Apr. 18, 2011.

* cited by examiner

*Primary Examiner* — Tom Duong
(74) *Attorney, Agent, or Firm* — Ditthavong Mori & Steiner, P.C.

(57) ABSTRACT

A honeycomb structural body includes a honeycomb unit having a plurality of through holes defined by cell walls and arranged in a longitudinal direction of the honeycomb unit. The honeycomb unit includes an inorganic binder, a first zeolite, and second zeolite. The first zeolite includes at least one of a β type zeolite and a ZSM-5 type zeolite, and primary particles having an average particle diameter of approximately 0.01 μm or more and approximately 0.1 μm or less. The second zeolite includes a phosphate group zeolite and primary particles having an average particle diameter of approximately 0.5 μm or more and approximately 5 μm or less. A ratio between a mass of the first zeolite and a total mass of the first and second zeolites is approximately 0.1 or more and approximately 0.5 or less.

49 Claims, 2 Drawing Sheets

HONEYCOMB STRUCTURAL BODY AND EXHAUST GAS CONVERTING APPARATUS

CROSS-REFERENCE TO RELATED APPLICATION

The present application claims priority under 35 U.S.C. §119 to International Application No. PCT/JP2009/069655, filed on Nov. 19, 2009. The contents of this application are incorporated herein by reference in their entirety.

BACKGROUND OF THE INVENTION

1. Technical Field

The present invention relates to a honeycomb structural body and an exhaust gas converting apparatus.

2. Background Art

Conventionally, as one of the automotive exhaust gas converting systems, an SCR (Selective Catalytic Reduction) system has been known in which NOx is reduced to nitrogen and water by using ammonia.

In the SCR system, zeolite is known as a material for absorbing ammonia.

In WO06/137149A1, a honeycomb structural body including a honeycomb unit is disclosed. The honeycomb unit includes inorganic particles and inorganic fibers and/or inorganic whiskers. The inorganic particles are selected from one or more materials of a group of alumina, silica, zirconia, titania, ceria, mullite, and zeolite.

The contents of International Patent Publication No. WO06/137149A1 are incorporated herein.

SUMMARY OF THE INVENTION

According to one aspect of the present invention, a honeycomb structural body includes a honeycomb unit having a plurality of through holes defined by cell walls and arranged in a longitudinal direction of the honeycomb unit. The honeycomb unit includes an inorganic binder, a first zeolite, and second zeolite. The first zeolite includes at least one of a β type zeolite and a ZSM-5 type zeolite, and primary particles having an average particle diameter of approximately 0.01 µm or more and approximately 0.1 µm or less. The second zeolite includes a phosphate group zeolite and primary particles having an average particle diameter of approximately 0.5 µm or more and approximately 5 µm or less. A ratio between a mass of the first zeolite and a total mass of the first and second zeolites is approximately 0.1 or more and approximately 0.5 or less.

According to another aspect of the present invention, an exhaust gas converting apparatus includes the above-described honeycomb structural body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

With the conventional honeycomb structural body of WO06/137149A1, it is desired that the NOx conversion efficiency be higher than a case where zeolite is used as the inorganic material including a honeycomb unit. For example, phosphate group zeolite (e.g., SAPO or the like) having high NOx conversion efficiency may be used as the zeolite. However, because water is absorbed by SAPO, for example, the crystal lattice constant of SAPO changes. Therefore, the honeycomb structural body including a honeycomb unit containing SAPO has a problem of expanding and/or contracting and being easily breakable due to water absorbed to and/or desorbed from the honeycomb unit.

In light of the above-described problem of the related art, an embodiment of the present invention is capable of providing a honeycomb structural body and an exhaust gas converting apparatus that have high NOx conversion efficiency and are capable of preventing a honeycomb unit from being broken by absorbing and/or desorbing of water.

In the following, embodiments of the present invention are described with reference to the accompanying drawings.

Figure 1:
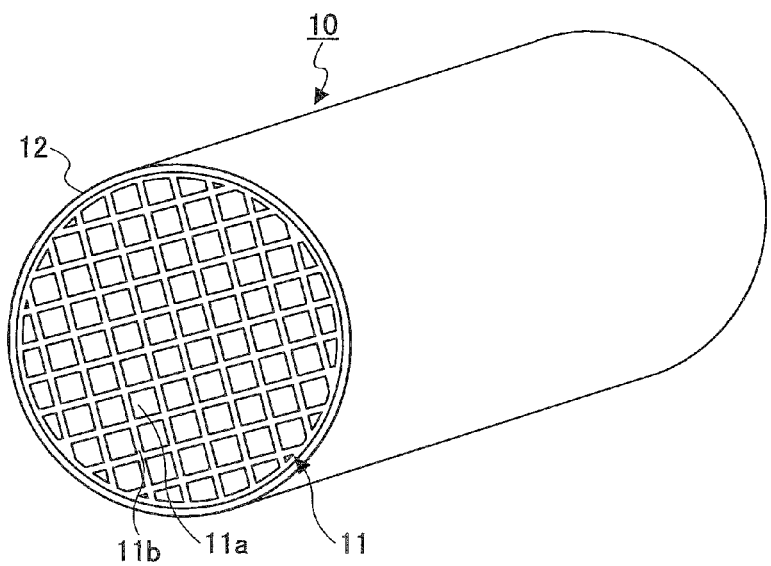
FIG. 1 is a perspective view illustrating an example of a honeycomb structural body according to an embodiment of the present invention.

FIG. 1 illustrates an example of a honeycomb structural body according to an embodiment of the present invention. The honeycomb structural body 10 has an outer peripheral coating layer 12 formed on an outer peripheral surface of a single honeycomb unit 11 including plural through holes 11a partitioned by cell walls 11b and arranged in a longitudinal direction thereof.

The honeycomb unit 11 includes a first zeolite, a second zeolite, and an inorganic binder.

The first zeolite includes a β type zeolite and/or a ZSM-5 type zeolite.

The average particle diameter of the primary particles of the first zeolite is preferably approximately 0.01 to approximately 0.1 µm. In a case where the average particle diameter of the primary particles of the first zeolite is equal to or more than approximately 0.01 µm or a case where the average particle diameter of the primary particles of the first zeolite is equal to or less than approximately 0.1 µm, it is difficult for the honeycomb unit 11 to be sufficiently prevented from being broken by adsorption and/or desorption of water.

The second zeolite includes a phosphate group zeolite. The phosphate group zeolite is not limited in particular. The phosphate group zeolite may be, for example, a SAPO (e.g., SAPO-5, SAPO-11, SAPO-34 and the like), a MeAPO, a MeAPSO and the like. Two or more kinds of phosphate group zeolites may be used.

The average particle diameter of the primary particles of the second zeolite is preferably approximately 0.5 to approximately 0.5 µm. In a case where the average particle diameter of the primary particles of the second zeolite is equal to or more than approximately 0.5 µm, it becomes difficult for exhaust gas to permeate through the inside of a cell wall 11b such that the first and second zeolites cannot be effectively used for NOx conversion. On the other hand, in a case where the average particle diameter of the primary particles of the second zeolite is more than 5 µm, it is difficult for the number of pores of the honeycomb unit 11 to decrease. Accordingly, it becomes easier for exhaust gas to permeate through the inside of the cell wall 11b such that it becomes easier for the first and second zeolites to be effectively used for NOx conversion.

The ratio of the mass of the first zeolite to the total mass of the first and second zeolites is preferably approximately 0.1 to approximately 0.5. In a case where the ratio is equal to or more than approximately 0.1, the honeycomb unit 11 becomes fragile during absorption and/or desorption of water. In a case where the ratio is equal to or less than approximately 0.5, it is difficult for the NOx conversion efficiency to decrease.

With this embodiment of the present invention, it is considered that the expanding or contracting of the honeycomb unit 11 can be reduced by providing the first zeolite at the periphery of the second zeolite and allowing water to be adsorbed or desorbed by the second zeolite. As a result, it becomes possible for breakage of the honeycomb structural body 10 to be prevented. Further, the NOx conversion rate of the honeycomb structural body 10 becomes higher because the first zeolite also has a NOx converting property.

Considering the NOx converting property, it is preferable for the first zeolite to include a zeolite being ion-exchanged with Cu and/or Fe. It is to be noted that the first zeolite may also include a zeolite which is not ion-exchaged and/or a zeolite ion-exchanged with a metal other than those described above.

The first zeolite being ion-exchanged with Cu and/or Fe is preferred to have an ion exchange amount from approximately 1.0 to approximately 5.0 mass %. In a case where the ion exchange amount of the first zeolite is equal to or more than approximately 1.0 mass %, it is less likely for the NOx conversion efficiency to become insufficient. On the other hand, in a case where the ion exchange amount of the first zeolite is equal to or less than approximately 5.0 mass %, it is difficult for the metal to be ion-exchanged to remain as oxide and more easier to be ion-exchanged.

Considering the NOx converting property, it is preferable for the second zeolite to include a zeolite being ion-exchanged with Cu and/or Fe. It is to be noted that the second zeolite may also include a zeolite which is not ion-exchaged and/or a zeolite ion-exchanged with a metal other than those described above.

The second zeolite being ion-exchanged with Cu and/or Fe is preferred to have an ion exchange amount from approximately 1.0 to approximately 5.0 mass %. In a case where the ion exchange amount of the second zeolite is equal to or more than approximately 1.0 mass %, it is less likely for the NOx conversion efficiency to become insufficient. On the other hand, in a case where the ion exchange amount of the second zeolite is equal to or less than approximately 5.0 mass %, it is difficult for the metal to be ion-exchanged to remain as oxide and more easier to be positively ion-exchanged.

Considering the NOx converting property, it is preferable for the first zeolite to be ion-exchanged with Fe and for the second zeolite to be ion-exchanged with Cu.

The honeycomb unit 11 is preferred to have a first and second zeolite content by weight per apparent volume from approximately 230 to approximately 360 g/L. In a case where the first and second zeolite content by weight per apparent volume of the honeycomb unit 11 is equal to or more than approximately 230 g/L, there is no need for the apparent volume of the honeycomb unit 11 to be increased in order to improve the NOx conversion efficiency. On the other hand, in a case where the first and second zeolite content by weight per apparent volume of the honeycomb unit 11 is equal to or less than approximately 360 g/L, it is difficult for the strength of the honeycomb unit 11 to become insufficient.

The inorganic binder(s) included in the honeycomb unit 11 is not limited in particular. The inorganic binder(s) included in the honeycomb unit 11 may be a solid content of, for example, alumina sol, silica sol, titania sol, soluble glass, sepiolite, attapulgite, and/or boehmite. Two or more kinds of inorganic binders may be used.

The content as solid content of the inorganic binder of the honeycomb unit 11 is preferably approximately 5 to approximately 30 mass %, and more preferably approximately 10 to approximately 20 mass %. In a case where the content as solid content of the inorganic binder is equal to or more than 5 mass %, it is difficult for the strength of the honeycomb unit 11 to decrease. On the other hand, in a case where the content as solid content of the inorganic binder is equal to or less than approximately 30 mass %, it becomes difficult to perform extrusion molding of the honeycomb unit 11.

In order to increase the strength of the honeycomb unit 11, it is preferable for the honeycomb unit 11 to further include an inorganic fiber and/or a scale-like material.

The inorganic fiber included in the honeycomb unit 11 is not limited to a particular material as long as the strength of the honeycomb unit 11 can be increased. The inorganic fiber may be, for example, alumina fibers, silica fibers, silicon carbide fibers, silica alumina fibers, glass fibers, potassium titanate fibers, aluminum borate fibers and the like. Two or more kinds of inorganic fibers may be used.

The aspect ratio of the inorganic fibers is preferably approximately 2 to approximately 1000, more preferably, approximately 5 to approximately 800, and still more preferably, approximately 10 to approximately 500. In a case where the aspect ratio of the inorganic fibers is equal to or more than approximately 2, it is difficult for the effect of increasing the strength of the honeycomb unit 11 to become low. On the other hand, in a case where the aspect ratio of the inorganic fibers is equal to or less than approximately 1000, it becomes difficult for clogging or the like, for example, to occur in the molding die when performing extrusion molding for forming the honeycomb unit 11. Further, it is difficult for breakage of the inorganic fibers to occur, such that it is difficult for the effect of increasing the strength of the honeycomb unit 11 to become low.

The scale-like material included in the honeycomb unit 11 is not to be limited to a particular material as long as the strength of the honeycomb unit 11 can be increased. The scale-like material may be, for example, glass, muscovite, alumina, silica, zinc oxide and the like. Two or more kinds of the scale-like material may be used.

The content of the inorganic fibers and the scale-like material in the honeycomb unit 11 is preferably approximately 3 to approximately 50 mass %, more preferably, approximately 3 to approximately 30 mass %, and still more preferably, approximately 5 to approximately 20 mass %. In a case where the content of the inorganic fibers and the scale-like material is equal to or more than approximately 3 mass %, it is difficult for the effect of increasing the strength of the honeycomb unit 11 to become low. On the other hand, in a case where the content of the inorganic fibers and the scale-like material is equal to or less than approximately 50 mass %, it is difficult for the content of the first and second zeolite inside the honeycomb unit 11 to decrease such that it is difficult for the NOx conversion efficiency to become low.

The honeycomb unit 11 preferably has a porosity of approximately 25 to approximately 40%. In a case where the porosity of the honeycomb unit 11 is equal to or more than approximately 25%, it becomes easy to allow exhaust gas to permeate into the partition walls 11b. Thus, it is easy for the first and second zeolites to be effectively used for NOx conversion. On the other hand, in a case where the porosity of the honeycomb unit 11 is equal to or less than approximately 40%, it becomes difficult for the strength of the honeycomb unit 11 to be insufficient.

It is to be noted that the porosity of the honeycomb unit 11 can be measured by using a mercury penetration method.

The aperture ratio of a cross section of the honeycomb unit 11 perpendicular to the longitudinal direction of the honeycomb unit 11 is preferably approximately 50 to approximately 75%. In a case where the aperture ratio of the cross section perpendicular to the longitudinal direction of the honeycomb unit 11 is equal to or more than approximately 50%, it becomes easy for the NOx conversion by the first and second zeolites to be used effectively. On the other hand, in a case where the aperture ratio of the cross section perpendicular to the longitudinal direction of the honeycomb unit 11 is equal to or less than approximately 75%, it becomes difficult for the strength of the honeycomb unit 11 to be insufficient.

The density of the through holes 11a of the cross section perpendicular to the longitudinal direction of the honeycomb unit 11 is preferably approximately 31 to approximately 124 units per $cm^2$. In a case where the density of the through holes 11a of the cross section perpendicular to the longitudinal direction of the honeycomb unit 11 is equal to or more than approximately 31 units per $cm^2$, it becomes easy for exhaust gas and the first and second zeolites to make contact. Thus, it becomes difficult for the NOx conversion efficiency may decrease. On the other hand, in a case where the density of the through holes 11a of the cross section perpendicular to the longitudinal direction of the honeycomb unit 11 is equal to or less than approximately 124 units per $cm^2$, it becomes difficult for the pressure loss of the honeycomb structural body 10 to increase.

The thickness of the partition wall 11b of the honeycomb unit 11 is preferably approximately 0.10 to approximately 0.50 mm, and more preferably approximately 0.15 to approximately 0.35 mm. In a case where the thickness of the partition wall 11b is equal to or more than approximately 0.10 mm, it is difficult for the strength of the honeycomb unit 11 to decrease. On the other hand, in a case where the thickness of the partition wall 11b is equal to or less than approximately 0.50 mm, it becomes easy to allow exhaust gas to permeate into the partition wall 11b. Thus, it becomes easy for the first and second zeolites to be effectively used for NOx conversion.

The thickness of the outer peripheral coating layer 12 is preferably approximately 0.1 to approximately 2 mm. In a case where the thickness of the outer peripheral coating layer 12 is equal to or more than approximately 0.1 mm, it becomes difficult for the effect of increasing the strength of the honeycomb structural body 10 to be insufficient. On the other hand, in a case where the thickness of the outer peripheral coating layer 12 is equal to or less than approximately 2 mm, it becomes difficult for the content of the first and second zeolite per volume unit of the honeycomb structural body 10 to decrease. Thus, it becomes difficult for the NOx conversion efficiency to decrease.

Although the shape of the honeycomb structure 10 in this embodiment is substantially cylindrical, the shape of the honeycomb structure 10 is not limited in particular. For example, the shape of the honeycomb structure 10 may be a substantially square pillar, a substantially cylindroid and the like. Further, although the shape of the through holes 11a in this embodiment is a substantially square pillar, the shape of the through holes is not limited in particular. The shape of the through holes 11a may be, for example, a substantially triangular pillar, a substantially hexagonal pillar and the like.

Next, an example of a method of manufacturing the honeycomb structural body 10 according to an embodiment of the present invention is described. First, a raw substantially cylindrical honeycomb molded body, in which plural through holes separated by walls are formed in parallel in a longitudinal direction, is manufactured by performing extrusion molding using a raw material paste containing a first zeolite, a second zeolite, and an inorganic binder (and according to necessity inorganic fiber and/or scale-like material). Thereby, it becomes possible for a substantially cylindrical honeycomb unit 11 having sufficient strength to be obtained even if firing temperature is low.

An inorganic binder(s) included in the raw material paste is added as, alumina sol, silica sol, titania sol, soluble glass, sepiolite, attapulgite, boehmite and the like. Two or more kinds of inorganic binders may be used.

Further, an organic binder, a dispersion medium, a molding aid, and the like may be arbitrarily added to the raw material paste, if necessary.

The organic binder is not limited in particular. The organic binder may be, for example, methylcellulose, carboxymethyl cellulose, hydroxylethyl cellulose, polyethyleneglycole, phenol resin, epoxy resin and the like. Two or more kinds of organic binders may be used. The adding amount of the organic binder is preferably approximately 1 to approximately 10 wt % of the total weight of the zeolite, the inorganic binder, the inorganic fibers, and the scale-like particles.

The dispersion medium is not limited in particular. The dispersion medium may be, for example, an organic solvent such as water and benzene, alcohol such as methanol and the like. Two or more kinds of dispersion media may be used.

The molding aid is not limited in particular. The molding aid may be, for example, ethylene glycol, dextrin, fatty acid, fatty acid soap, polyalcohol and the like. Two or more kinds of molding aids may be used.

When the raw material paste is prepared, it is preferable to be mixed, kneaded and the like. The raw material paste can be mixed by using a mixer, an attritor (grinding mill), or the like, and can be kneaded by a kneader or the like.

Next, the obtained honeycomb molded body is dried by using a drying apparatus such as a microwave drying apparatus, a hot air drying apparatus, a dielectric drying apparatus, a reduced pressure drying apparatus, a vacuum drying apparatus, and a freeze drying apparatus.

Further, the obtained dried honeycomb molded body is degreased. The degreasing conditions are not particularly limited and can be arbitrarily selected depending on the amount and kind of organic substances contained in the honeycomb molded body. However, the honeycomb molded body is preferably degreased at approximately 400° C. for approximately 2 hours.

Then, by firing the obtained degreased honeycomb molded body, the honeycomb unit 11 having the substantially cylindrical shape is obtained. The firing temperature is preferably approximately 600 to approximately 1200° C., and more preferably approximately 600 to approximately 1000° C. In a case where the firing temperature is equal to or more than approximately 600° C., it becomes easy for the sintering to progress, such that it becomes difficult for the strength of the honeycomb unit 11 to become low. On the other hand, in a case where the firing temperature is equal to or less than approximately 1200° C., the sintering does not excessively progress such that it becomes difficult for the reactive sites of the first and second zeolites to decrease.

Then, an outer peripheral coating layer paste is applied onto an outer peripheral surface of the substantially cylindrical honeycomb unit 11.

The outer peripheral coating layer paste is not limited in particular. The outer peripheral coating layer paste may be, for example, a mixture of an inorganic binder and inorganic particles, a mixture of the inorganic binder and inorganic fibers, a mixture of the inorganic binder, the inorganic particles, and the inorganic fibers, or the like.

Further, the outer peripheral coating layer paste may further contain an organic binder. The organic binder is not limited in particular. The organic binder may be, for example, polyvinyl alcohol, methylcellulose, ethylcellulose, carboxymethyl cellulose and the like. Two or more kinds of the organic binders may be used.

Then, by drying and solidifying the honeycomb unit 11 having the outer peripheral coating layer paste applied thereto, the honeycomb structural body 10 having the cylindrical shape is obtained. In a case where the outer peripheral coating layer paste contains an organic binder, a degreasing process is preferably performed on the honeycomb structural body 10. The degreasing conditions can be arbitrarily selected depending on the amount and kind of organic substances. However, the degreasing conditions are preferably at approximately 700° C. for approximately 20 minutes.

By having the honeycomb unit 11 steeped into a solution containing Cu ions or Fe ions, the first and second zeolites can be ion exchanged. Further, a raw material paste containing at least one of the first zeolite being ion exchanged by Cu and/or Fe and the second zeolite being ion exchanged by Cu and/or Fe may be used as the raw material paste.

Figure 2:
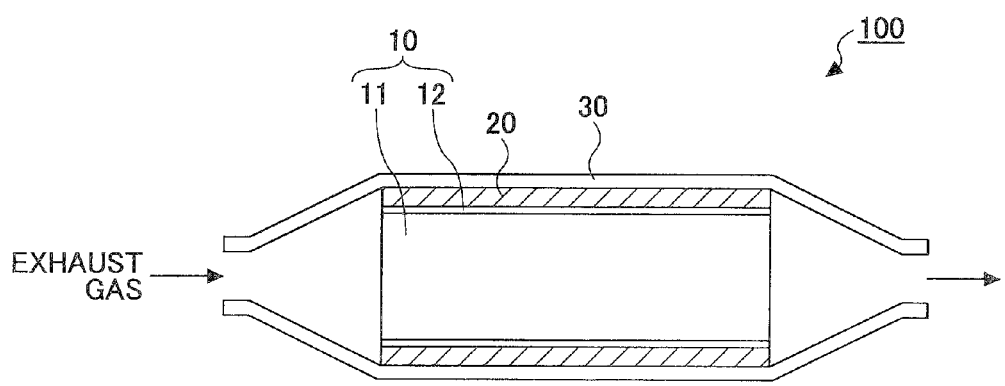
FIG. 2 is a cross-sectional view illustrating an example of an exhaust gas converting apparatus according to an embodiment of the present invention.

FIG. 2 illustrates an example of an exhaust gas converting apparatus 100 according to an embodiment of the present invention. In a case where a holding sealing member 20 is provided at an outer peripheral part of the honeycomb structural body 10, an exhaust gas converting apparatus 100 (see FIG. 2) is obtained by canning the honeycomb structural body 10 to a metal pipe 30. In the exhaust gas converting apparatus 100, an ejector (not illustrated) such as an ejection nozzle for ejecting ammonia or a precursor thereof is provided at an upstream side of the honeycomb structural body 10 relative to an exhaust gas flowing direction. Thereby, ammonia is added to the exhaust gas. As a result, the NOx gas included in the exhaust gas is reduced by the first and second zeolites included in the honeycomb unit 11. Considering preservation stability of ammonia or the precursor thereof, it is preferable to use urea water as the precursor of ammonia. It is to be noted that ammonia is generated by heating the urea water in the exhaust gas and hydrolyzing the urea water.

Figure 3:
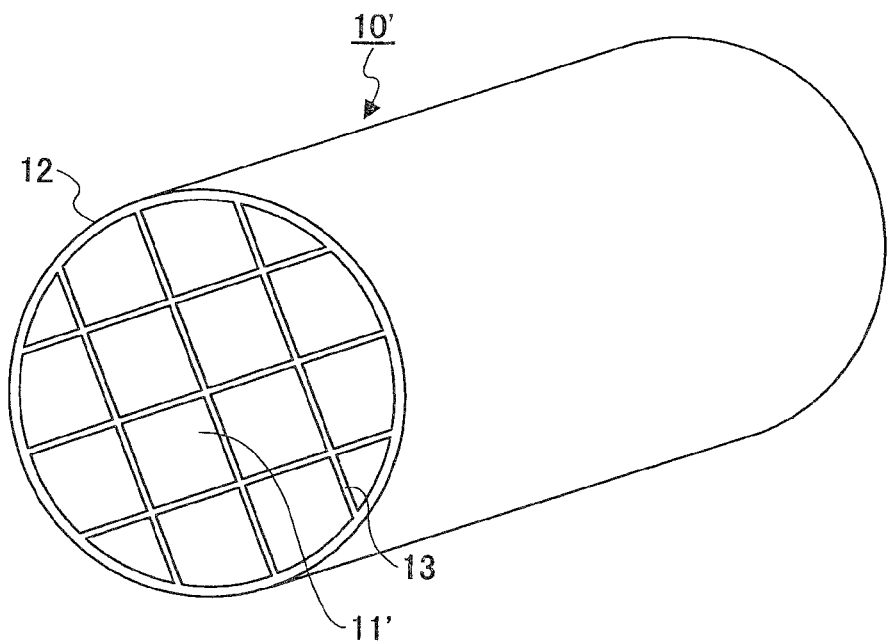
FIG. 3 is a perspective view illustrating other modified example of the honeycomb structural body according to an embodiment of the present invention.
Figure 4:
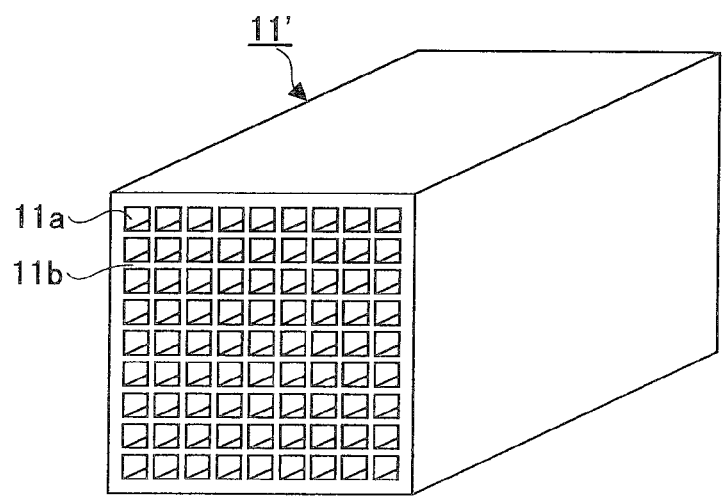
FIG. 4 is a perspective view illustrating the honeycomb unit constituting the honeycomb structural body of FIG. 3.

FIG. 3 illustrates another modified example of the honeycomb structural body 10 according to an embodiment of the present invention. Other than the adhesive layer 13 adhering plural honeycomb units 11' (see FIG. 4) having plural through holes 11a defined by cell walls 11b and arranged in the longitudinal direction of the honeycomb units 11', the honeycomb structural body 10' is the same as the honeycomb structural body 10.

The cross section of the honeycomb unit 11' perpendicular to the longitudinal direction of the honeycomb unit 11' preferably has an area of approximately 5 to approximately 50 $cm^2$. In a case where the area of the cross section of the honeycomb unit 11' perpendicular to the longitudinal direction of the honeycomb unit is equal to or more than approximately 5 $cm^2$, it becomes difficult for the pressure loss of the honeycomb structural body 10' to increase. On the other hand, in a case where the area of the cross section of the honeycomb unit 11' perpendicular to the longitudinal direction of the honeycomb unit is equal to or less than approximately 50 $cm^2$, it becomes difficult for the strength against thermal stress of the honeycomb unit 11' to be insufficient.

The thickness of the adhesive layer 13 is preferably approximately 0.5 to approximately 2 mm. In a case where the thickness of the adhesive layer 13 is equal to or more than approximately 0.5 mm, it becomes difficult for the adhesive strength to be insufficient. On the other hand, in a case where the thickness of the adhesive layer is equal to or less than approximately 2 mm, it becomes difficult for the pressure loss of the honeycomb structural body 10' to increase.

Further, except for the honeycomb units 11' located at the outer peripheral part of the honeycomb structural body 10' is a rectangular pillar shape, the shape of the honeycomb unit 11' of the structural body 10' is not limited in particular. For example, the shape of the honeycomb unit 11 may be a hexagonal pillar.

Next, an example of a method for manufacturing the honeycomb structural body 10' according to an embodiment of the present invention is described. First, in the same manner as the honeycomb structural body 10, a honeycomb unit 11' having a square pillar shape is formed. Then, an adhesive layer paste is applied to the outer peripheral surface of the honeycomb unit 11'. Then, such honeycomb units 11' are adhered together and solidified by drying. Thereby, an aggregate of the honeycomb units 11' can be manufactured.

In this case where the aggregate of honeycomb units 11' is manufactured, the aggregate of the honeycomb unit 11' may be cut and polished into a substantially cylindrical shape. Further, honeycomb units 11', which are molded having a substantially fan-shape or a substantially quadrate shape as the cross section perpendicular to the longitudinal direction of the honeycomb unit 11, may be adhered together to form a substantially cylindrical-shaped aggregate of the honeycomb units 11'.

The adhesive layer paste is not to be limited in particular. The adhesive layer paste may be, for example, a mixture of an inorganic binder and inorganic particles, a mixture of the inorganic binder and inorganic fibers, a mixture of the inorganic binder, the inorganic particles, and the inorganic fibers, or the like.

Further, the adhesive layer paste may further contain an organic binder. The organic binder is not limited in particular. The organic binder may be, for example, polyvinyl alcohol, methylcellulose, ethylcellulose, carboxymethyl cellulose and the like. Two or more kinds of the organic binders may be used.

Then, an outer peripheral coating layer paste is applied to an outer peripheral surface of the cylindrical shaped aggregate of the honeycomb units 11'. The outer peripheral coating layer paste is not limited in particular. The outer peripheral coating layer paste may be, for example, the same as or different from the material of the adhesive layer paste. Further, the outer peripheral coating layer paste may have substantially the same composition as the adhesive layer paste.

Then, the aggregate of the honeycomb units 11 being coated with the outer peripheral coating layer paste is solidified by drying. Thereby, a substantially cylindrical shaped honeycomb structural body 10' is obtained. In a case where the adhesive layer paste and/or the outer peripheral coating layer paste of the honeycomb structural body 10' contains an organic binder, a degreasing process is preferably performed on the honeycomb structural body 10'. The degreasing conditions can be arbitrarily selected depending on the amount and kind of organic substances. However, the degreasing conditions are preferably at approximately 700° C. for approximately 20 minutes.

It is to be noted that the honeycomb structural bodies 10 and 10' may be formed without the outer peripheral coating layer 12.

EXAMPLES

Example 1

A raw material paste 1 was prepared by mixing and kneading: a β type zeolite (930 g) used as a first zeolite being ion-exchanged with Fe of 2.7 mass % and having primary particles having an average particle diameter of 0.05 μm; a SAPO (3100 g) used as a second zeolite being ion-exhanged with Cu of 2.7 mass % and having primary particles having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Then, extrusion molding was performed on the raw material paste by using an extruder. Thereby, a raw quadrate pillar-shaped honeycomb molded body was obtained. Then, the honeycomb molded body was dried for 10 minutes at 110° c. by using a microwave drying apparatus and a hot air drying apparatus. Then, the dried honeycomb molded body is degreased at 400° c. for 5 hours. Then, the degreased honeycomb molded body is fired at 700° c. for 2 hours. Thereby, a honeycomb unit 11' is manufactured having quadrate pillar-shape whose single side is 34.3 mm and length is 150 mm. The honeycomb unit 11' density of the through holes 11a was 93 units/cm² and the thickness of the cell walls was 0.23 mm.

Then, a heat resistant adhesive layer paste was prepared by mixing and kneading: alumina fiber (767 g) having an average fiber diameter of 0.5 μm and an average fiber length of 15 μm; silica glass (2500 g); carboxyl methylcellulose (17 g); silica sol (600 g) of 30 mass % as solid content; polyvinyl alcohol (167 g); surface active agent (167 g); and alumina balloon (17 g).

16 honeycomb units 11' were adhered together by applying the adhesive layer paste to the honeycomb units 11. The adhesive layer paste is applied so that the thickness of the adhesive layer is 2 mm. The adhesive layer paste was solidified by drying at a temperature of 150° c. for 10 minutes. Then, an aggregate of the honeycomb units 11' was obtained by cutting the aggregate honeycomb units 11' into a cylindrical shape with a diamond cutter so that the cross section perpendicular to the longitudinal direction of the honeycomb units 11' becomes substantially point symmetrical.

Then, an adhesive layer paste was applied to the outer peripheral surface of the aggregate of the honeycomb units 11' so that the thickness of the outer peripheral coating layer becomes 1 mm. Then, the adhesive layer paste is solidified by drying the adhesive layer paste at 150° c. for 10 minutes by using a microwave drying apparatus and a hot air drying apparatus and is degreased at 400° c. for 2 hours. Thereby, a honeycomb structural body 10' having a cylindrical shape with a diameter of 143.8 mm and a height of 150 mm was obtained.

Then, the honeycomb structural body 10' was canned to a metal pipe (shell) in a state where the holding sealing member (mat made from inorganic material) 20 is provided on the outer peripheral part of the honeycomb structural body 10'. Thereby, an exhaust gas converting apparatus was obtained (see FIG. 2).

Example 2

A raw material paste 2 was prepared by mixing and kneading: a β type zeolite (310 g) used as a first zeolite being ion-exchanged with Fe of 2.7 mass % and having primary particles having an average particle diameter of 0.05 μm; a SAPO (2790 g) used as a second zeolite being ion-exchanged with Cu of 2.7 mass % and having primary particles having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 2 instead of using the raw material paste 1, the honeycomb structural body 10' and the exhaust gas purification apparatus was manufactured in the same manner as Example 1.

Example 3

A raw material paste 3 was prepared by mixing and kneading: a β type zeolite (1550 g) used as a first zeolite being ion-exchanged with Fe of 2.7 mass % and having primary particles having an average particle diameter of 0.05 μm; a SAPO (1550 g) used as a second zeolite being ion-exchanged with Cu of 2.7 mass % and having primary particles having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 3 instead of using the raw material paste 1, the honeycomb structural body 10' and the exhaust gas purification apparatus was manufactured in the same manner as Example 1.

Example 4

A raw material paste 4 was prepared by mixing and kneading: a β type zeolite (930 g) used as a first zeolite being ion-exchanged with Fe of 2.7 mass % and having primary particles having an average particle diameter of 0.10 μm; a SAPO (2170 g) used as a second zeolite being ion-exchanged with Cu of 2.7 mass % and having primary particles having an average particle diameter of 0.5 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 4 instead of using the raw material paste 1, the honeycomb structural body 10' and the exhaust gas purification apparatus was manufactured in the same manner as Example 1.

Example 5

A raw material paste 5 was prepared by mixing and kneading: a β type zeolite (930 g) used as a first zeolite being ion-exchanged with Fe of 2.7 mass % and having primary particles having an average particle diameter of 0.01 μm; a SAPO (2170 g) used as a second zeolite being ion-exchanged with Cu of 2.7 mass % and including primary particles having an average particle diameter of 5 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 5 instead of using the raw material paste 1, the honeycomb structural body 10' and the exhaust gas purification apparatus was manufactured in the same manner as Example 1.

Comparative Example 1

A raw material paste 6 was prepared by mixing and kneading: a SAPO (3100 g) used as a second zeolite being ion-exhanged with Cu of 2.7 mass % and having primary particles having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 6 instead of using the raw material paste 1, the honeycomb structural body 10' and the exhaust gas purification apparatus was manufactured in the same manner as Example 1.

Comparative Example 2

A raw material paste 7 was prepared by mixing and kneading: a β type zeolite (1860 g) used as a first zeolite being ion-exchanged with Fe of 2.7 mass % and having primary particles having an average particle diameter of 0.05 μm; a SAPO (1240 g) used as a second zeolite being ion-exhanged with Cu of 2.7 mass % and having primary particles having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 7 instead of using the raw material paste 1, the honeycomb structural body 10' and the exhaust gas purification apparatus was manufactured in the same manner as Example 1.

Comparative Example 3

A raw material paste 8 was prepared by mixing and kneading: a β type zeolite (930 g) used as a first zeolite being ion-exchanged with Fe of 2.7 mass % and having primary particles having an average particle diameter of 0.15 μm; a SAPO (2170 g) used as a second zeolite being ion-exhanged with Cu of 2.7 mass % and having primary particles having an average particle diameter of 0.5 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 8 instead of using the raw material paste 1, the honeycomb structural body 10' and the exhaust gas purification apparatus was manufactured in the same manner as Example 1.

Comparative Example 4

A raw material paste 9 was prepared by mixing and kneading: a β type zeolite (930 g) used as a first zeolite being ion-exchanged with Fe of 2.7 mass % and having primary particles having an average particle diameter of 0.01 μm; a SAPO (2170 g) used as a second zeolite being ion-exhanged with Cu of 2.7 mass % and having primary particles having an average particle diameter of 6 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Except for using the raw material paste 9 instead of using the raw material paste 1, the honeycomb structural body 10' and the exhaust gas purification apparatus was manufactured in the same manner as Example 1.

[Evaluation of Cracks]

Whether there are any cracks on the surface of the honeycomb unit 11' was evaluated by visual observation where the exhaust gas converting apparatuses of the Examples 1 to 5 and the Comparative Examples 1 to 4 were left to stand in the atmosphere for 2 hours.

[Measurement of NOx Conversion Efficiency]

Samples for evaluation are obtained from the honeycomb structural bodies 10' manufactured in the Examples 1 to 5 and the Comparative Examples 1 to 4 by cutting out a part of the quadrate pillar shaped honeycomb unit 11' whose single side is 34.3 mm and length is 40 mm.

In a state where an imitation gas of 150° c. is allowed to flow into each of the samples at a space velocity (SV) of 35000/hr, a catalyst evaluation apparatus SIGU (manufactured by Horiba Ltd.) was used to measure the outflow of nitric oxide (NO) flowing out from the samples and to measure the NOx converting efficiency [%] expressed with a formula "(inflow of NO−outflow of NO)/(outflow of NO)× 100". The composition of the imitation gas is nitric oxide (175 ppm), nitrogen dioxide (175 ppm), ammonia (350 ppm), oxygen (14 volume %), carbon dioxide (5 volume %), water (10 volume %), and nitrogen (balance). The evaluation results of the cracks and the measurement results of NOx conversion efficiency are shown in Table 1.

TABLE 1

| | AVERAGE PARTICLE DIAMETER OF PRIMARY PARTICLE [μm] | | RATIO OF MASS OF β TYPE ZEOLITE TO TOTAL MASS OF β TYPE | | NOx CONVERSION EFFICIENCY |
|---|---|---|---|---|---|
| | β TYPE ZEOLITE | SAPO | ZEOLITE AND SAPO | CRACK | [%] |
| EXAMPLE 1 | 0.05 | 3 | 0.3 | NO | 62 |
| EXAMPLE 2 | 0.05 | 3 | 0.1 | NO | 65 |
| EXAMPLE 3 | 0.05 | 3 | 0.5 | NO | 58 |
| EXAMPLE 4 | 0.10 | 0.5 | 0.3 | NO | 60 |
| EXAMPLE 5 | 0.01 | 5 | 0.3 | NO | 58 |
| COMPARATIVE EXAMPLE 1 | — | 3 | 0 | YES | — |
| COMPARATIVE EXAMPLE 2 | 0.05 | 3 | 0.6 | NO | 48 |
| COMPARATIVE EXAMPLE 3 | 0.15 | 0.5 | 0.3 | YES | — |
| COMPARATIVE EXAMPLE 4 | 0.01 | 6 | 0.3 | YES | — |

According to Table 1, it can be understood that the exhaust gas converting apparatuses of Examples 1 to 5 can prevent generation of cracks. Further, it can be understood that the samples cut out from the honeycomb structural bodies 10' manufactured in Examples 1 to 5 have a tendency of having high NOx conversion efficiency.

According to the above, it can be understood that by providing the first zeolite being a β type zeolite and having primary particles having an average particle diameter of approximately 0.01 to approximately 0.1 μm, providing the second zeolite being a phosphate group zeolite having primary particles having an average particle diameter of approximately 0.5 to approximately 5 µm, and providing a ratio between the mass of the first zeolite and the total mass of the first and second zeolites of approximately 0.1 to approximately 0.5, the honeycomb structural body 10' and the exhaust gas converting apparatus can have high NOx conversion efficiency and prevent the honeycomb unit 11' from being broken by absorption and/or desorption of water.

Although this embodiment is described with the honeycomb structural body 10', the same effect can be attained with the honeycomb structural body 10.

Further, although this embodiment is described with the β type zeolite, the same effect can be attained with a ZSM-5 zeolite.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A honeycomb structural body comprising:
   a honeycomb unit having a plurality of through holes defined by cell walls and arranged in a longitudinal direction of the honeycomb unit, the honeycomb unit comprising:
   an inorganic binder;
   a first zeolite comprising:
      at least one of a β type zeolite and a ZSM-5 type zeolite; and
      primary particles having an average particle diameter of approximately 0.01 µm or more and approximately 0.1 µm or less; and
   a second zeolite comprising:
      a phosphate group zeolite; and
      primary particles having an average particle diameter of approximately 0.5 µm or more and approximately 5 µm or less, a ratio between a mass of the first zeolite and a total mass of the first and second zeolites being approximately 0.1 or more and approximately 0.5 or less.

2. The honeycomb structural body as claimed in claim 1, wherein the phosphate group zeolite comprises at least one of SAPO, MeAPO, and MeAPSO.

3. The honeycomb structural body as claimed in claim 2, wherein the SAPO comprises at least one of SAPO-5, SAPO-11, and SAPO-34.

4. The honeycomb structural body as claimed in claim 1, wherein at least one of the first zeolite and the second zeolite comprises a zeolite ion-exchanged with at least one of Cu and Fe.

5. The honeycomb structural body as claimed in claim 4, wherein the first zeolite is ion-exchanged with Fe and the second zeolite is ion-exchanged with Cu.

6. The honeycomb structural body as claimed in claim 5, wherein the first zeolite being ion-exchanged with at least one of Cu and Fe has an ion exchange amount from approximately 1.0 mass % to approximately 5.0 mass %.

7. The honeycomb structural body as claimed in claim 5, wherein the second zeolite being ion-exchanged with at least one of Cu and Fe has an ion exchange amount from approximately 1.0 mass % to approximately 5.0 mass %.

8. The honeycomb structural body as claimed in claim 1, wherein the inorganic binder comprises a solid containing at least one of alumina sol, silica sol, titania sol, soluble glass, sepiolite, attapulgite, and boehmite.

9. The honeycomb structural body as claimed in claim 1, wherein the honeycomb unit further comprises at least one of an inorganic fiber and a scale-like material.

10. The honeycomb structural body as claimed in claim 9,
    wherein the inorganic fiber comprises at least one of alumina fiber, silica fiber, silicon carbide fiber, silica alumina fiber, glass fiber, potassium titanate fiber, and aluminum borate fiber, and
    wherein the scale-like material comprises at least one of glass, muscovite, alumina, silica, and zinc oxide.

11. The honeycomb structural body as claimed in claim 9, wherein a content of the inorganic fiber and the scale-like material is approximately 3 mass % to approximately 50 mass %.

12. The honeycomb structural body as claimed in claim 1, wherein the honeycomb structural body comprises a plurality of honeycomb units.

13. The honeycomb structural body as claimed in claim 12, wherein a cross section of the honeycomb units perpendicular to a longitudinal direction of the honeycomb units has an area of approximately 5 cm$^2$ to approximately 50 cm$^2$.

14. The honeycomb structural body as claimed in claim 1, wherein the honeycomb structural body comprises a single honeycomb unit.

15. The honeycomb structural body as claimed in claim 1, comprising an outer peripheral coating layer formed on an outer peripheral surface of the honeycomb structural body.

16. The honeycomb structural body as claimed in claim 1, wherein the honeycomb unit has a zeolite content by weight per apparent volume from approximately 230 g/L to approximately 360 g/L.

17. The honeycomb structural body as claimed in claim 1, wherein a content of the inorganic binder as solid content is approximately 5 mass % to approximately 30 mass %.

18. The honeycomb structural body as claimed in claim 1, wherein the honeycomb unit has a porosity of approximately 25% to approximately 40%.

19. The honeycomb structural body as claimed in claim 1, wherein an aperture ratio of a cross section of the honeycomb unit perpendicular to the longitudinal direction of the honeycomb unit is approximately 50% to approximately 75%.

20. The honeycomb structural body as claimed in claim 1, wherein a density of the through holes of a cross section perpendicular to the longitudinal direction of the honeycomb unit is approximately 31 units per cm$^2$ to approximately 124 units per cm$^2$.

21. The honeycomb structural body as claimed in claim 1, wherein a thickness of each of the cell walls of the honeycomb unit is approximately 0.10 mm to approximately 0.50 mm.

22. The honeycomb structural body as claimed in claim 1, wherein the honeycomb unit is so constructed as to be obtained by firing with a temperature of approximately 600° C. to approximately 1200° C.

23. The honeycomb structural body as claimed in claim 1, wherein the honeycomb structural body is so constructed as to be used for an SCR system.

24. An exhaust gas converting apparatus comprising:
    the honeycomb structural body as claimed in claim 1.

25. The exhaust gas converting apparatus as claimed in claim 24, wherein the exhaust gas converting apparatus is canned to a metal pipe in a state where a holding sealing member is provided at an outer peripheral part of the honeycomb structural body.

26. The exhaust gas converting apparatus as claimed in claim 24, wherein the exhaust gas converting apparatus has an ejector to eject ammonia or a precursor of the ammonia provided at an upstream side of the honeycomb structural body relative to an exhaust gas flowing direction.

27. The exhaust gas converting apparatus as claimed in claim 26, wherein the precursor of the ammonia comprises urea water.

28. The exhaust gas converting apparatus as claimed in claim 24, wherein the phosphate group zeolite comprises at least one of SAPO, MeAPO, and MeAPSO.

29. The exhaust gas converting apparatus as claimed in claim 28, wherein the SAPO comprises at least one of SAPO-5, SAPO-11, and SAPO-34.

30. The exhaust gas converting apparatus as claimed in claim 24, wherein at least one of the first zeolite and the second zeolite comprises a zeolite ion-exchanged with at least one of Cu and Fe.

31. The exhaust gas converting apparatus as claimed in claim 30, wherein the first zeolite is ion-exchanged with Fe and the second zeolite is ion-exchanged with Cu.

32. The exhaust gas converting apparatus as claimed in claim 31, wherein the first zeolite being ion-exchanged with at least one of Cu and Fe has an ion exchange amount from approximately 1.0 mass % to approximately 5.0 mass %.

33. The exhaust gas converting apparatus as claimed in claim 31, wherein the second zeolite being ion-exchanged with at least one of Cu and Fe has an ion exchange amount from approximately 1.0 mass % to approximately 5.0 mass %.

34. The exhaust gas converting apparatus as claimed in claim 24, wherein the inorganic binder comprises a solid comprising at least one of alumina sol, silica sol, titania sol, soluble glass, sepiolite, attapulgite, and boehmite.

35. The exhaust gas converting apparatus as claimed in claim 24, wherein the honeycomb unit further comprises at least one of an inorganic fiber and a scale-like material.

36. The exhaust gas converting apparatus as claimed in claim 35,
wherein the inorganic fiber comprises at least one of alumina fiber, silica fiber, silicon carbide fiber, silica alumina fiber, glass fiber, potassium titanate fiber, and aluminum borate fiber, and
wherein the scale-like material comprise at least one of glass, muscovite, alumina, silica, and zinc oxide.

37. The exhaust gas converting apparatus as claimed in claim 35, wherein a content of the inorganic fiber and the scale-like material is approximately 3 mass % to approximately 50 mass %.

38. The exhaust gas converting apparatus as claimed in claim 24, wherein the honeycomb structural body comprises a plurality of honeycomb units.

39. The exhaust gas converting apparatus as claimed in claim 38, wherein a cross section of the honeycomb units perpendicular to a longitudinal direction of the honeycomb units has an area of approximately 5 $cm^2$ to approximately 50 $cm^2$.

40. The exhaust gas converting apparatus as claimed in claim 24, wherein the honeycomb structural body comprises a single honeycomb unit.

41. The exhaust gas converting apparatus as claimed in claim 24, wherein the honeycomb structural body has an outer peripheral coating layer formed on an outer peripheral surface of the honeycomb structural body.

42. The exhaust gas converting apparatus as claimed in claim 24, wherein the honeycomb unit has a zeolite content by weight per apparent volume from approximately 230 g/L to approximately 360 g/L.

43. The exhaust gas converting apparatus as claimed in claim 24, wherein a content of the inorganic binder as solid content is approximately 5 mass % to approximately 30 mass %.

44. The exhaust gas converting apparatus as claimed in claim 24, wherein the honeycomb unit has a porosity of approximately 25% to approximately 40%.

45. The exhaust gas converting apparatus as claimed in claim 24, wherein an aperture ratio of a cross section of the honeycomb unit perpendicular to the longitudinal direction of the honeycomb unit is approximately 50% to approximately 75%.

46. The exhaust gas converting apparatus as claimed in claim 24, wherein a density of the through holes of the cross section perpendicular to the longitudinal direction of the honeycomb unit is approximately 31 units per $cm^2$ to approximately 124 units per $cm^2$.

47. The exhaust gas converting apparatus as claimed in claim 24, wherein a thickness of each of the cell walls of the honeycomb unit is approximately 0.10 mm to approximately 0.50 mm.

48. The exhaust gas converting apparatus as claimed in claim 24, wherein the honeycomb unit is so constructed as to be obtained by firing with a temperature of approximately 600° C. to approximately 1200° C.

49. The exhaust gas converting apparatus as claimed in claim 1, wherein the honeycomb structural body is so constructed as to be used for an SCR system.

* * * * *